United States Patent
Pedersen et al.

(10) Patent No.: US 7,068,979 B2
(45) Date of Patent: Jun. 27, 2006

(54) MOBILE TELECOMMUNICATIONS DEVICE

(75) Inventors: Per Pedersen, Slagelse (DK); Alireza Asadi Sohi, Hvidovre (DK); Jens Madsen, Ringsted (DK); Kenn Berend Pedersen, Copenhagen (DK); Per Højlev, Frederiksberg (DK)

(73) Assignee: Nokia Corporation, Espoo (FI)

( * ) Notice: Subject to any disclaimer, the term of this patent is extended or adjusted under 35 U.S.C. 154(b) by 555 days.

(21) Appl. No.: 09/993,654

(22) Filed: Nov. 27, 2001

(65) Prior Publication Data

US 2003/0100273 A1    May 29, 2003

(51) Int. Cl.
*H04B 1/38* (2006.01)

(52) U.S. Cl. ............... 455/90.3; 455/571.1; 455/575.3; 455/575.8; 381/345; 381/350; 381/351; 381/353; 379/430; 379/433.02; 379/432

(58) Field of Classification Search ............... 455/90.3, 455/575.1, 575.3, 575.4, 575.8; 381/370, 381/371, 372, 374, 379, 386, 345, 350, 351, 381/353, 354, 391, 189; 379/430, 433.02
See application file for complete search history.

(56) References Cited

U.S. PATENT DOCUMENTS

| | | | | |
|---|---|---|---|---|
| 5,790,679 A | * | 8/1998 | Hawker et al. | 381/163 |
| 5,909,498 A | * | 6/1999 | Smith | 381/380 |
| 5,923,750 A | * | 7/1999 | Enting et al. | 379/433.03 |
| 5,963,434 A | * | 10/1999 | Jonsson et al. | 361/814 |
| 5,999,821 A | * | 12/1999 | Kaschke | 455/575.1 |
| 6,002,949 A | * | 12/1999 | Hawker et al. | 455/569.1 |
| 6,084,976 A | * | 7/2000 | Lin | 381/380 |
| 6,374,120 B1 | * | 4/2002 | Krauss | 455/550.1 |
| 6,549,169 B1 | * | 4/2003 | Matsuyoshi et al. | 343/702 |
| 2002/0197965 A1 | * | 12/2002 | Peng | 455/90 |

FOREIGN PATENT DOCUMENTS

EP    909077 A2 *  4/1999

* cited by examiner

*Primary Examiner*—Curtis Kuntz
*Assistant Examiner*—Tuan Pham
(74) *Attorney, Agent, or Firm*—Alston & Bird LLP

(57) ABSTRACT

A mobile telecommunications device is disclosed and comprises a casing (2), an earpiece (6), and a cover (33) associated with the earpiece (6) to define a resonant cavity (34) between the earpiece (6) and the casing (2), wherein the cover (33) has an opening therein for the transmission of sound from the earpiece (6) via the cavity (34) into an acoustic path formed between the casing (2) and the cover (33).

10 Claims, 3 Drawing Sheets

MOBILE TELECOMMUNICATIONS DEVICE

BACKGROUND OF THE INVENTION

1. Field of the Invention

The present invention relates to the field of mobile telecommunications devices and, in particular, to mobile telephones.

2. Description of Prior Art

A conventional mobile telephone includes a housing comprising a front and rear casing. It is common for the front and/or rear casing to be interchangeable with other casings having a different shape and/or color thereby enabling the owner to customize the appearance of their device as they wish. The front casing is provided with one or more apertures in the vicinity of the earpiece which act as acoustic ducts for the transmission of sound generated by the earpiece through the casing so that it can be heard by the user when the telephone is held against the head.

In many countries, the connection of a mobile telecommunications device to a public network requires that the device be type-approved by a regulatory body. However, for GSM or the "Global System for Mobile Communications", common specifications have been drawn up so that there is mutual recognition of type approval of all telecommunications devices across Europe and other countries that have adopted the GSM standards. Type approval standards include reference to user safety, compatibility of equipment and the inter-working of mobile telecommunications devices with public telecommunications equipment.

One specific area of the GSM standard defines the acoustic response of the earpiece and specifies type approval limits for the receiving frequency response (RFR) and the receiving loudness rating (RLR).

By changing the shape of the front casing in addition to its thickness and the size/number and distribution of sound transmission holes, the acoustic high frequency response of the earpiece is altered. This causes a problem with type approval because not all exchangeable covers have an identical number/size or distribution of sound transmission holes so it is necessary to ensure that the high frequencies are tuned for every separate front casing that may be used with the device otherwise the type approval limits relating to the acoustic response of the earpiece may not be met. Although this has proved possible with an older generation of mobile telephones having a small range of different cover sets each with a similar number and distribution of sound transmission holes, modern telecommunication devices have a much wider variety of differently designed cover sets each having a completely random distribution and pattern of sound transmission holes. This means that individual high frequency tuning of each cover set to ensure the earpiece has the required acoustic response to meet the type to approval limits set by the GSM standard becomes difficult, if not impossible.

Furthermore, as specific type approval limits must be met and the high frequency response of the telephone is dependent on the shape and configuration of the casing, design freedom is lost as not all desirable cover designs will meet the specified criteria.

In addition to ensuring that any type approval limits are met and the cover is high frequency tuned, it is also necessary to design the earpiece and front cover to ensure that the device is leak tolerance tuned. Leak tolerance has a significant effect on the handling of the telephone. For example, in a device having a non-leak tolerant design, the volume in the human ear will influence the performance an external leak will be created if the telephone is not held tight against the head, thereby significantly altering the sound quality. Therefore, the position of the telephone in relation to the user's ear is a critical factor in the quality of the sound that is heard. On the contrary, with a good leak tolerant system, a natural internal leak is generated from the back of the earpiece to the sound transmission holes in the front casing and the external leaks are minimized so the sound quality is not so heavily dependent on the position of the device relative to the ear. From the foregoing, it will be appreciated that it is desirable to introduce internal loss in the earpiece design and reduce external loss to obtain optimum sound quality that depends very little on the orientation of the telephone with respect to the ear. Conventionally, the casing is provided with sound transmission holes and separate leak holes to provide the required leak tolerance. However, this design is not particularly well suited to exchangeable covers as often, the design allows only very few leak holes.

Finally, the location of the earpiece in relation to the sound transmission holes in the front casing significantly affects the performance of the earpiece. For optimum sound transmission through the front casing, the earpiece should preferably be located centrally and symmetrical relative to the sound transmission holes. If it is non-symmetrical, the sound pressure generated by the earpiece will be reduced substantially. It is also sometimes necessary to position a gasket between the front of the earpiece and the front casing to obtain optimum sound reproduction through the front casing. This also reduces design freedom, as the cover and/or earpiece must be designed to complement each other and the gasket must be a snug fit between the front casing and the earpiece if it is to perform its function correctly.

SUMMARY OF THE INVENTION

It is an object of the present invention to overcome or alleviate the problems with a conventional mobile telecommunications device discussed above.

According to the present invention, there is provided a mobile telecommunications device comprising a casing, an earpiece, and a cover associated with the earpiece to define a resonant cavity between the earpiece and the casing, wherein the cover has an opening therein for the transmission of sound from the earpiece via the cavity into an acoustic path formed between the casing and the cover.

By providing a cover around the earpiece that defines a resonant cavity, the earpiece can be tuned with respect to that rather than with respect to the casing of the device, thereby ensuring that the device will meet type approval limits irrespective of the design, shape and form of the casing. Furthermore, as there is now an acoustic path formed between the cover and the casing, the device has a good leak tolerant design, just as would be provided by having many large sound transmission holes in the casing.

Preferably, the acoustic path extends laterally away from the earpiece between the casing and the cover.

In a preferred embodiment, the cover is spaced from the earpiece by a gasket.

The earpiece is preferably mounted to a substrate and the cover is a plate that extends over the substrate.

Advantageously, the substrate is a lightguide assembly.

The resonant cavity is conveniently partially formed by a depression in the plate.

Preferably, the acoustic path between the casing and the cover is configured to increase internal leaking of sound generated by the earpiece to improve the leak tolerance of the device.

In a preferred embodiment, the casing has a plurality of apertures therein for the external transmission of sound from the device via the resonant cavity and the acoustic path.

The casing is preferably interchangeable with one or more other casings each having a plurality of apertures therein for the external transmission of sound from the device, the number and/or arrangement of apertures in each casing being different and the resonant cavity and the acoustic path being configured so that the acoustic response of the earpiece remains substantially the same irrespective of which casing is attached to the device.

The mobile telecommunications device according to the invention is preferably a mobile telephone.

The present invention also provides a method of manufacturing a mobile telecommunications device comprising a casing, an earpiece, and a cover associated with the earpiece to define a resonant cavity between the earpiece and the casing, wherein the method includes the step of tuning the cover to the frequency of the earpiece such that the configuration of the casing has substantially no effect on the acoustic response of the earpiece.

DETAILED DESCRIPTION OF A PREFERRED EMBODIMENT

An embodiment of the invention will now be described, by way of example only, with reference to the accompanying drawings.

Figure 1:
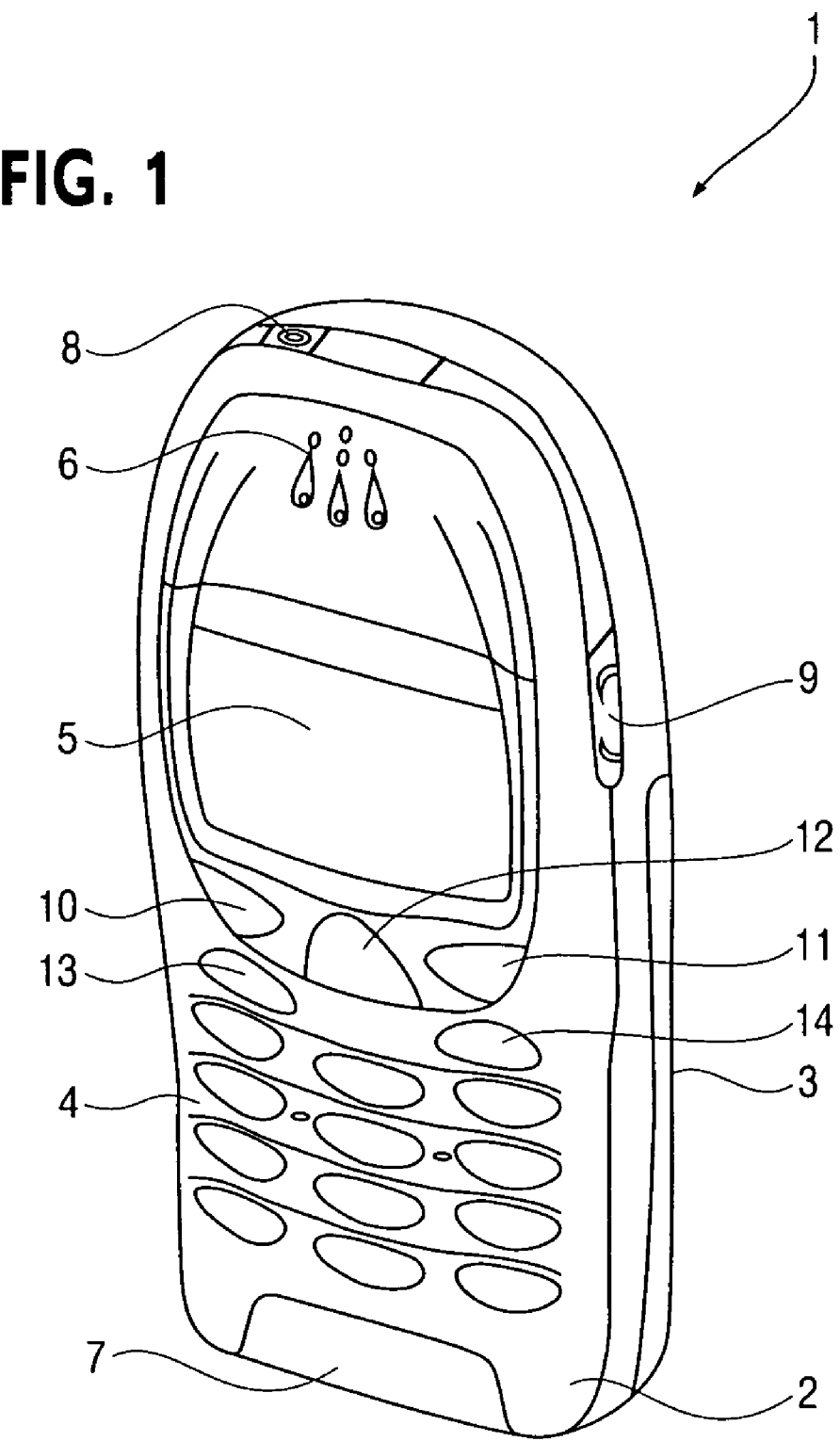
FIG. 1 illustrates a mobile telephone according to a preferred embodiment of the invention.

The preferred electronic device to which this invention is applicable is a mobile telephone such as that illustrated in FIG. 1. The telephone 1 has a front casing portion 2 and a rear casing portion 3. A user interface is provided in the front casing portion 2 and comprises a key pad 4, an electronic display 5, an ear-piece 6, a microphone 7, an on/off key 8 and a scroll key 9 for highlighting a particular item in a menu to enable its selection or for controlling the volume of the sound emitted through the ear-piece 6. The telephone 1 is adapted to enable communication via a wireless telecommunications network, for example, a cellular network. However, the telephone 1 could also be designed for a cordless network.

The keypad 4 has a first group of keys which are alphanumeric to enable a user to enter a telephone number, write a text message (SMS) or enter a name associated with a particular number, etc. The key pad 4 additionally includes five soft keys 10,11,12,13,14. The first soft key 10 is used to access the menu structure and select a function in the menu. Its function changes depending on the status of the telephone 1. The second soft key 11 is used to scroll up and down in the display while a menu is displayed. It is also used to access the first entry in the phonebook when the telephone 1 is in a starting position and is ready for use. The third soft key 12 is used to enter the phonebook options when the telephone 1 is in the starting position. However, when in the menu structure, the third soft key 12 is used to close the menu structure or erase entered characters. The fourth and fifth soft keys 13,14 are call handling keys. The first call handling key 13 is used to start a call or establish a conference call and the second call handling key 14 is used to end a conference call or reject and incoming call.

Figure 2:
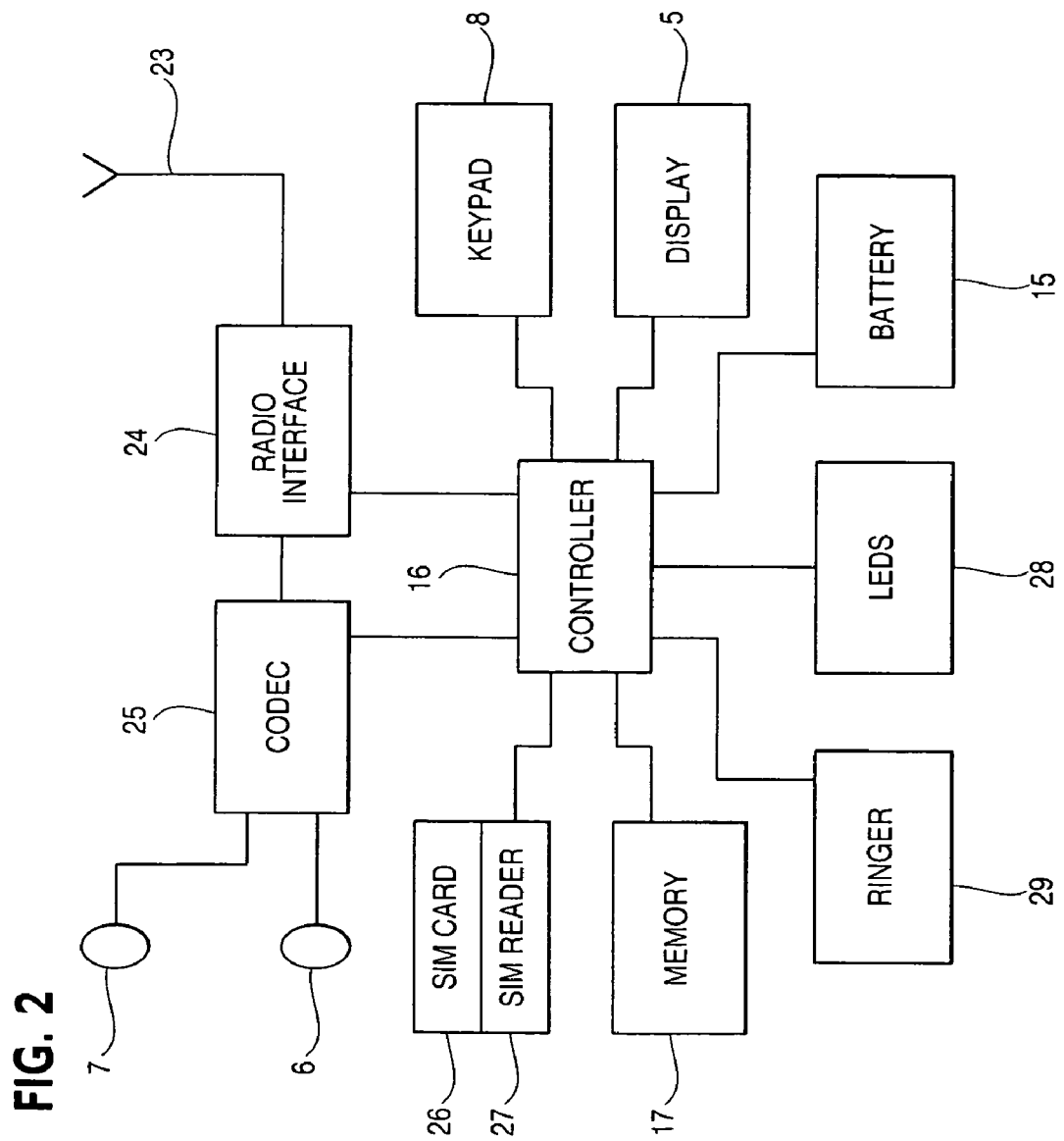
FIG. 2 illustrates a schematic representation of the electronic components of the mobile telephone shown in FIG. 1.

FIG. 2 shows a schematic representation of the main components of the mobile telephone illustrated in FIG. 1. The telephone is powered by a removable battery pack 15. Signal processing is carried out under the control of a digital micro-controller 16 which has an associated RAM/ROM and flash memory 18. Electric analog signals are produced by microphone 7 and are fed to the earpiece 6. The controller 16 receives instruction signals from the keypad 4 including the soft keys 10,11,12,13,14 and controls the operation of the display 5. Radio signals are transmitted and received by means of an antenna 23 connected through a radio interface 24 to a codec 25 configured to process signals under control of the controller 16. Thus, in use, for speech, the codec 25 receives analog signals from the microphone 7, digitizes them into a form suitable for transmission and feeds them to the radio interface 24 for transmission through antenna element 23 to the public land mobile network (PLMN). Similarly, received signals are fed to codec 25 so as to produce analog signals which are fed to the ear piece 6. The telephone 1 also includes a subscriber identification module (SIM) card 26, a SIM card reader 27, light emitting diodes (LEDs) 28 and a ringer 29. The individual circuits and elements are of a type well known in the art, for example, in the Nokia range of mobile telephones.

Figure 3:
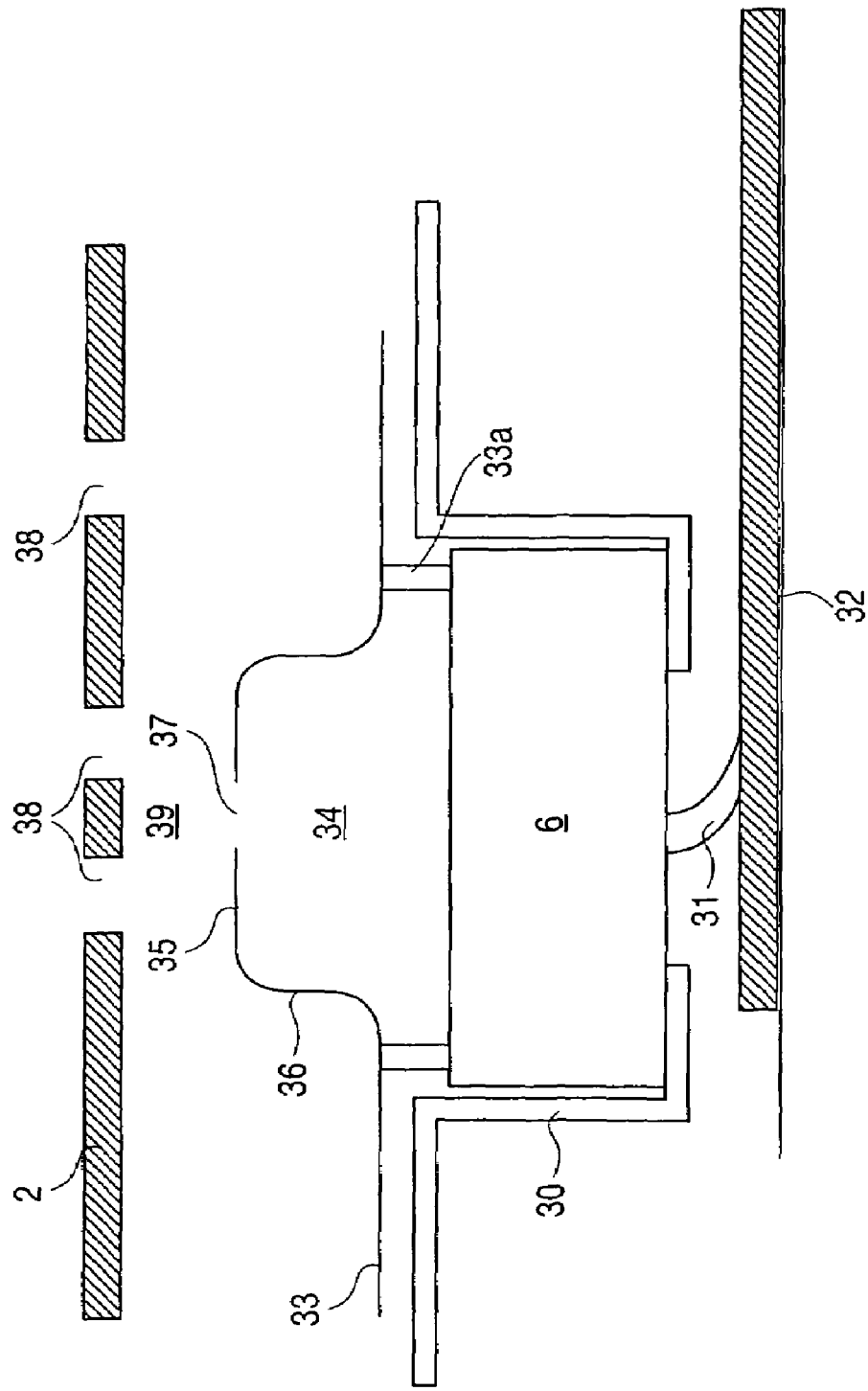
FIG. 3 illustrates a side sectional view of a portion of a mobile telephone in the region of the earpiece according to the present invention.

The structure of the mobile telephone in the region of the earpiece will now be described with reference to FIG. 3 from which it can be seen that the earpiece 6 is mounted in a frame or light-guide assembly 30 and includes spring contacts 31 that make an electrical connection with a printed circuit board 32 disposed beneath the earpiece 6. A cover formed from a metal plate or frame 33 is disposed on the light guide assembly 30 over the earpiece 6 and is separated therefrom by a gasket 33a. A portion of the plate 33 in the region above the earpiece 6 is bent to form a chamber or cavity 34 above the earpiece 6 having an upper wall 35 and a side wall 36. This chamber 34 acts as a resonant cavity for the sound generated by the earpiece 6. An opening 37 is formed in a central area of the upper wall 35 to allow sound generated by the earpiece 6 to pass via the cavity 34 into an acoustic path 39 between the plate 33 and the casing 2. The casing 2, having sound transmission holes 38 therein, is separated from the plate 33 by the acoustic path. As there is no gasket between the metal plate 33 and the casing 2, an internal loss is created in the acoustic path which improves the leak tolerance performance of the device, similar to that obtained by providing many large sound transmission holes 38 in the casing. In a particularly preferred arrangement a good leak tolerant design is obtained by providing an internal volume between the casing and the earpiece of at least 1–3 cubic centimeters with 4–5 sound transmission holes of 1.0 to 1.5 mm diameter.

As the plate 33 forms a resonant cavity 34 in a region surrounding the earpiece 6, the frequencies which are normally tuned with respect to the casing 2 to give the required resonance can instead be tuned with respect to the plate 33. This means that a neutral casing 2 can be used or, more specifically, a casing 2 whose design has little or no effect on the acoustic characteristics or acoustic response of the earpiece.

Many modifications and variations of the invention falling within the terms of the following claims will be apparent to those skilled in the art and the foregoing description should be regarded as a description of the preferred embodiments only.

The invention claimed is:

1. A mobile telecommunications device comprising a casing, an earpiece, and a cover associated with the earpiece to define a resonant cavity between the earpiece and the casing, wherein the cover has an opening therein for the transmission of sound from the earpiece via the cavity into an acoustic path formed between the casing and the cover, wherein the casing is interchangeable with at least one other casing, each casing having a plurality of apertures therein for the external transmission of sound from the device, at least one of a number and arrangement of apertures in each casing being different and the resonant cavity and the acoustic path being configured so that an acoustic response of the earpiece remains substantially the same irrespective of which casing is attached to the device.

2. A mobile telephone according to claim 1, wherein the acoustic path extends laterally away from the earpiece between the casing and the cover.

3. A mobile telecommunications device according to claim 1, wherein the cover is spaced from the earpiece by a gasket.

4. A mobile telecommunications device according to claim 1, wherein the earpiece is mounted to a substrate and the cover is a metal plate that extends over the substrate.

5. A mobile telecommunications device according to claim 4, wherein the substrate is a lightguide assembly.

6. A mobile telecommunications device according to claim 4, wherein the resonant cavity is partially formed by a depression in the plate.

7. A mobile telecommunications device according to claim 1, wherein the acoustic path between the casing and the cover is configured to increase internal leaking of sound generated by the earpiece to improve leak tolerance of the device.

8. A mobile telecommunications device according to claim 1, comprising a mobile telephone.

9. A method of manufacturing a mobile telecommunications device comprising a casing, an earpiece, and a cover associated with the earpiece to define a resonant cavity between the earpiece and the casing, wherein the casing is interchangeable with at least one other each casing having a plurality of apertures herein for the external transmission of sound from the device, at least one of a number and arrangement of apertures in each casing being different and the resonant cavity and the acoustics path being configured so that an acoustic response of the earpiece remains substantially the same irrespective of which casing is attached to the device, and wherein the method includes the step of tuning the cover to the frequency of the earpiece such that the configuration of each casing has substantially no effect on the acoustic response of the earpiece.

10. A method of manufacturing a mobile telecommunications device according to claim 9 wherein the mobile telecommunications device comprises a mobile telephone.

* * * * *

UNITED STATES PATENT AND TRADEMARK OFFICE
CERTIFICATE OF CORRECTION

PATENT NO.       : 7,068,979 B2
APPLICATION NO.  : 09/993654
DATED            : June 27, 2006
INVENTOR(S)      : Pedersen et al.

It is certified that error appears in the above-identified patent and that said Letters Patent is hereby corrected as shown below:

Column 1,

Line 67, after "performance" insert --and--.

Column 6,

Line 15, after "other" insert --casing,--;

Line 16, "herein" should read --therein--;

Line 19, "acoustics" should read --acoustic--.

Signed and Sealed this

Twenty-seventh Day of February, 2007

JON W. DUDAS
*Director of the United States Patent and Trademark Office*